United States Patent [19]

Tomoguchi

[11] Patent Number: 5,373,220
[45] Date of Patent: Dec. 13, 1994

[54] NUMERICAL CONTROL DEVICE FOR DRIVING NON-ORTHOGONAL MECHANICAL AXES

[75] Inventor: Yoshihiro Tomoguchi, Aichi, Japan
[73] Assignee: Mitsubishi Denki Kabushiki Kaisha, Tokyo, Japan
[21] Appl. No.: 72,952
[22] Filed: Jun. 8, 1993
[30] Foreign Application Priority Data Jun. 8, 1992 [JP] Japan ................... 4-146093

[51] Int. Cl.$^5$ ............................ G05B 19/18
[52] U.S. Cl. .................. 318/569; 318/568.1; 318/568.19; 318/573
[58] Field of Search ............... 318/569, 568.1, 568.19, 318/573

[56] References Cited

U.S. PATENT DOCUMENTS

| | | | |
|---|---|---|---|
| 4,659,971 | 4/1987 | Suzuki et al. | 318/568 |
| 4,954,762 | 9/1990 | Mayake et al. | 318/568.19 |
| 5,065,333 | 11/1991 | Kawamura et al. | 318/573 |
| 5,075,865 | 12/1991 | Kawamura et al. | 318/573 |

FOREIGN PATENT DOCUMENTS

| | | |
|---|---|---|
| 62-282863 | 12/1987 | Japan . |
| 62-282863 | 12/1987 | Japan . |
| 64-21610 | 1/1989 | Japan . |
| 1021610 | 1/1989 | Japan . |
| 3086444 | 4/1991 | Japan . |

OTHER PUBLICATIONS

Siemens Energy & Automation, "New Sinumerik 810 Functions for Universal Control with Specialist Capabilities", vol. 9, No. Special Emo '87, Oct. 1987, pp. 11-15.

*Primary Examiner*—William M. Shoop, Jr.
*Assistant Examiner*—Karen Masih
*Attorney, Agent, or Firm*—Sughrue, Mion, Zinn, Macpeak & Seas

[57] ABSTRACT

A numerical control device for driving at least two mechanical axes which are not orthogonal to each other, including an inclination ratio setting device for setting an inclination ratio (angle) between actual mechanical axes corresponding to axes of a pseudo-set orthogonal coordinate system; an orthogonal axis direction mechanical error storage device for storing a mechanical error measured in the axial direction of the virtual orthogonal coordinate system; and an error converting device for obtaining a mechanical error in the actual mechanical axis direction from the orthogonal axis direction mechanical error and the set inclination of the mechanical axis.

13 Claims, 9 Drawing Sheets

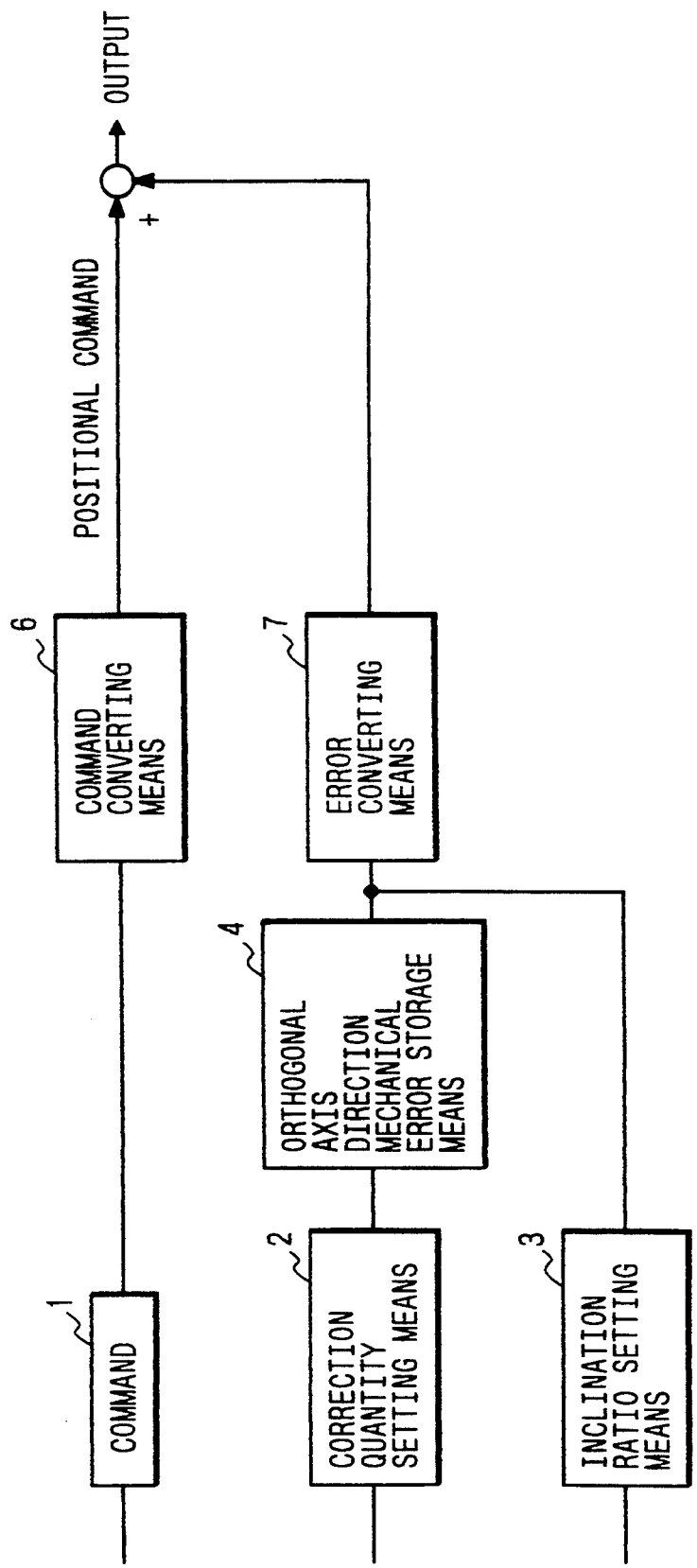

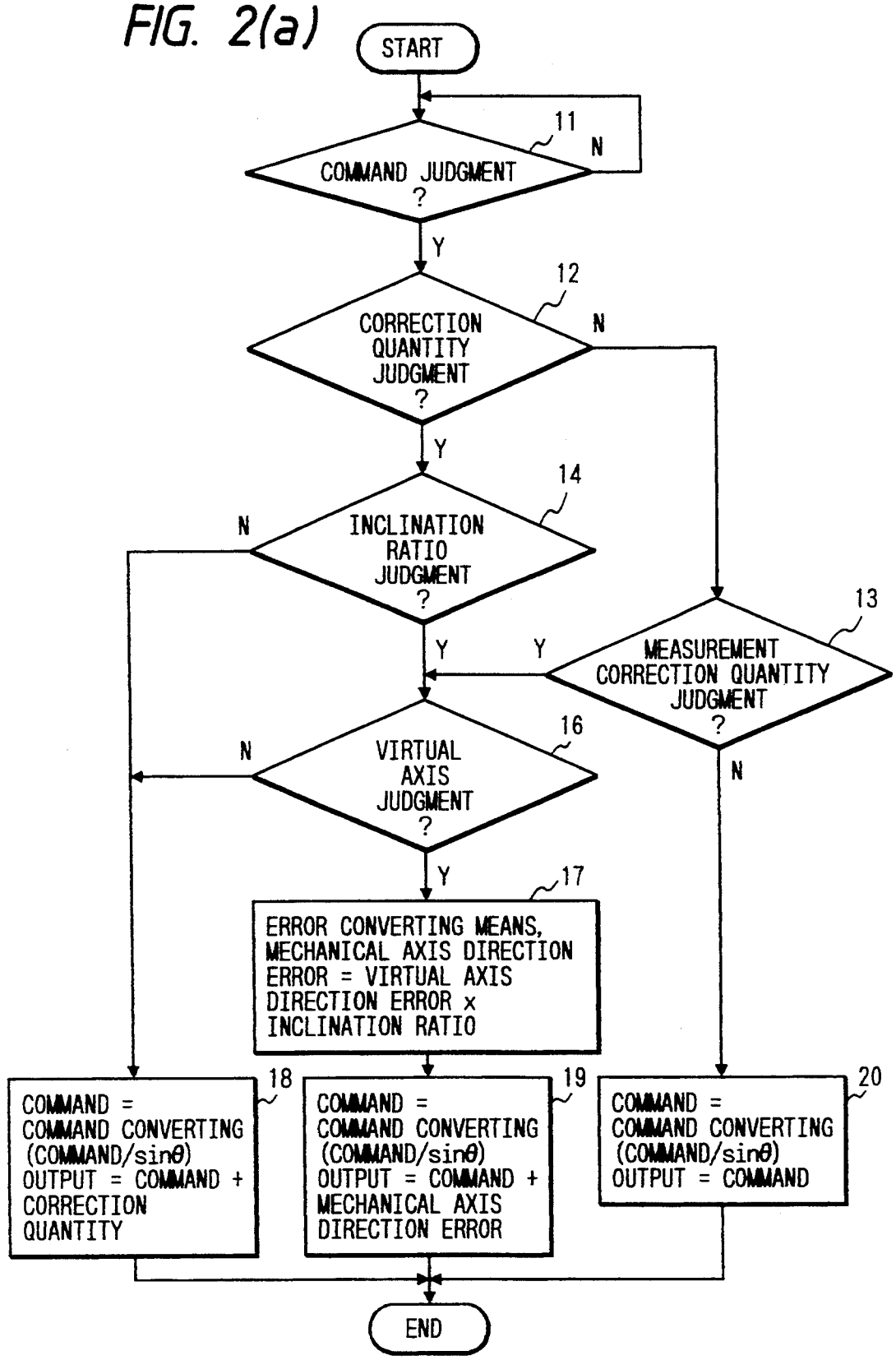

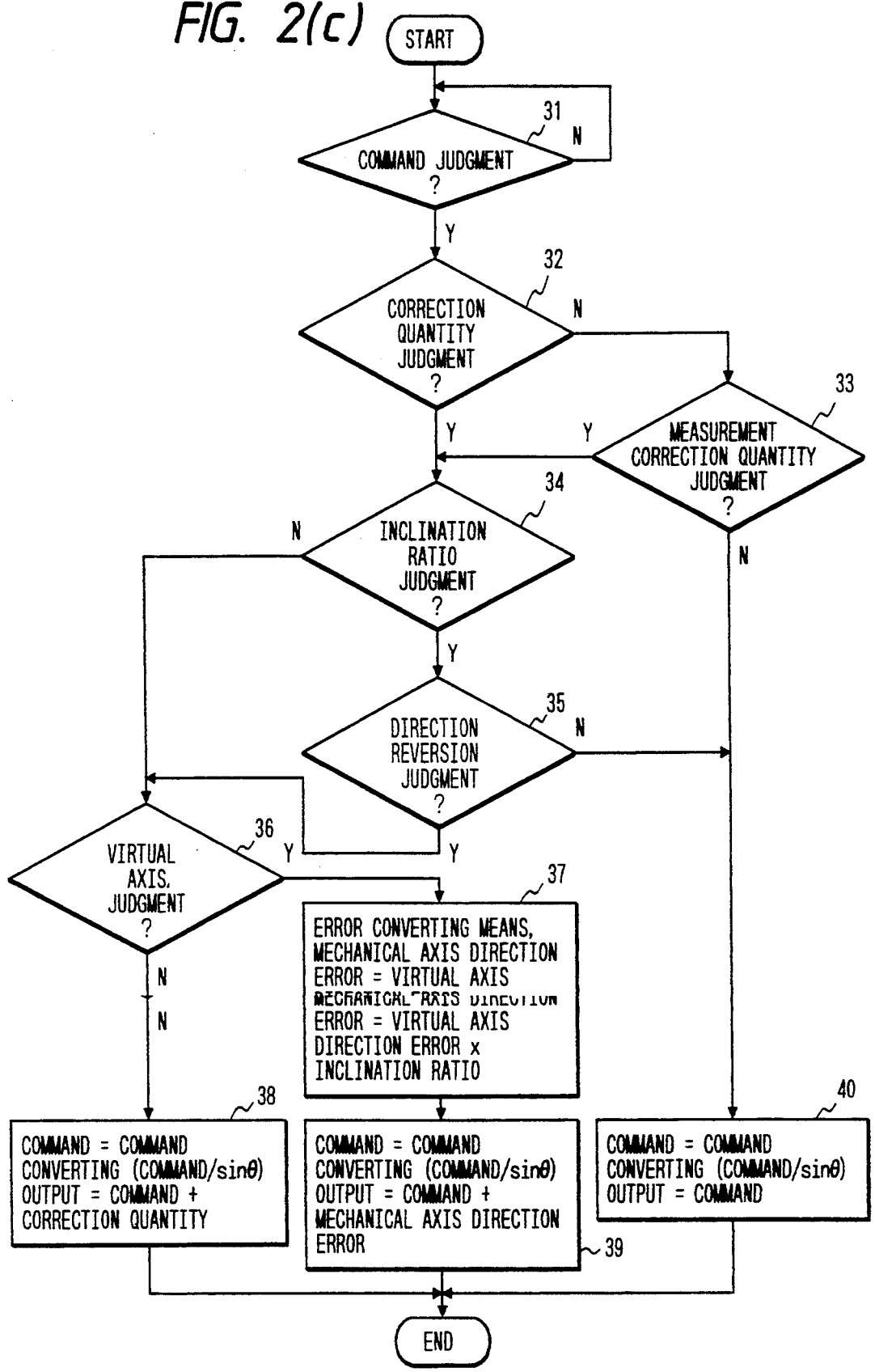

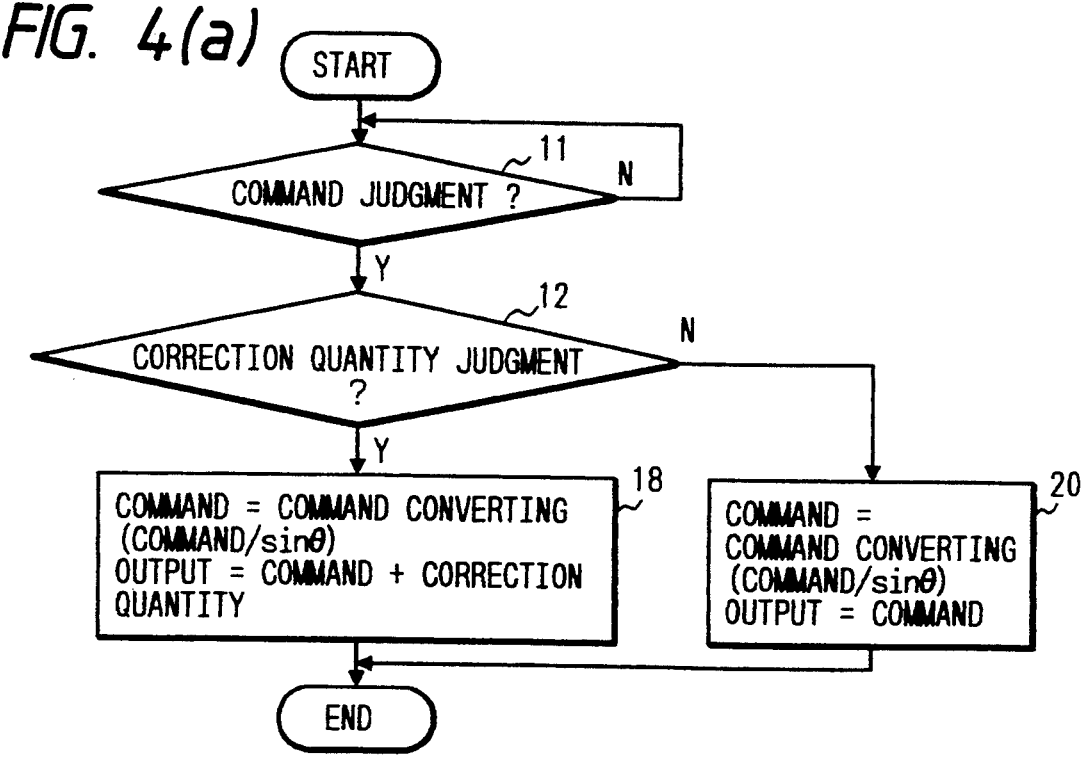
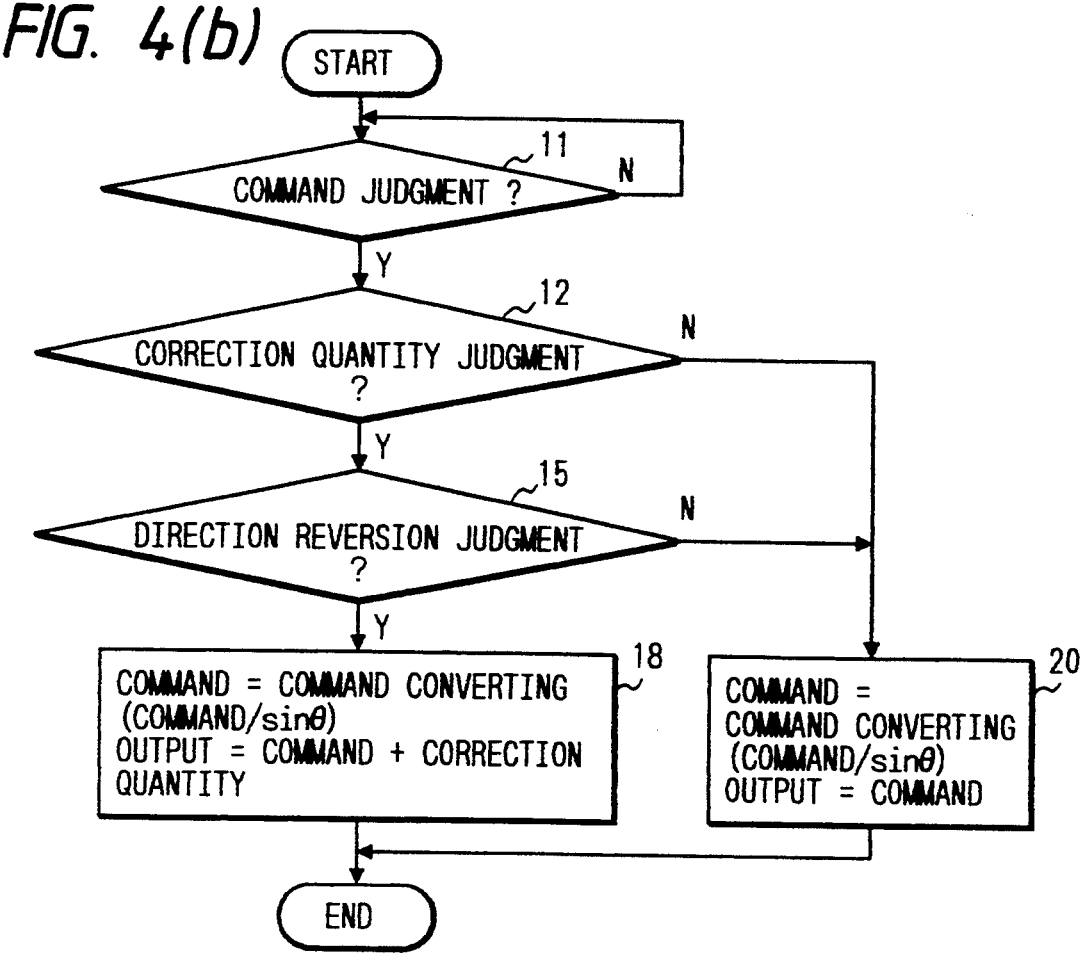

NUMERICAL CONTROL DEVICE FOR DRIVING NON-ORTHOGONAL MECHANICAL AXES

FIELD OF THE INVENTION

The present invention generally relates to mechanical error corrections (e.g., pitch error correction and backlash error correction) in a numerical control device and, more particularly, to mechanical error corrections in a numerical control device which controls a machine tool defined within a coordinate System having at least two axes that are not orthogonal to each other.

BACKGROUND OF THE INVENTION

An explanation will first be provided of a conventional method of setting a mechanical error correction quantity for mechanical axes which are not orthogonal to each other. FIG. 5(a) shows a grinding tool using a grindstone which moves up and down and which is displayed along a mechanical axis (Z axis) in a direction Z1 with an inclination of, e.g., 45° relative to a horizontal mechanical axis (X axis) on which a workpiece is mounted. A coordinate system (Z1-X1) in the moving directions thereof is referred to as an actual or mechanical axis coordinate system, and thus the terms "mechanical axis" and "actual axis" are used interchangeably herein. However, machining work to be performed by the tool is expressed in terms of an orthogonal coordinate system, and hence a command is issued while (virtually) assuming an orthogonal coordinate system (axes Z2-X1 in FIG. 5(a)). This is referred to as a virtual orthogonal coordinate system. In the conventional system, the Z axis is set as an oblique moving axis for movement in the direction Z1, thereby attempting to obtain improved moving accuracy in the direction Z2 relative to the machining accuracy of the Z axis in the Z2 direction. For example, if it is presumed that the accuracy of the Z axis is 10 $\mu$m in the Z1 direction, then the accuracy in the Z1 direction is improved since 10 $\mu$m (Z2 direction)$\div\sqrt{2}$=7.071 $\mu$m (Z1 direction). There is not, however, provided a gauge for measuring a mechanical error with respect to the inclined axis (i.e., Z1 direction). Rather, a gauge is provided for measuring a mechanical error with respect to an axis of the virtual orthogonal coordinate system (i.e., Z2 direction). Specifically, as shown in FIG. 5(a), a gauge 53 of, e.g., 10 mm stands vertically on an X-axis table 52. The mechanical axis Z is located at an origin position (point A). A micrometer provided at the tip of the Z axis is made to contact the gauge, and an indicator of the micrometer is set to 0 at this position. The mechanical axis Z is moved by, for example, 10$\times\sqrt{2}$ mm (10 mm in the virtual orthogonal coordinate system direction Z2) in the direction Z1. The micrometer at the tip of the Z axis contacts the gauge at for example point B, thus reading an error representing the difference between the commanded amount of movement of the tool and the actual amount of movement of the tool. This error is converted by the operator into a mechanical error (gauge value$\times\sqrt{2}$=mechanical error in the direction Z1) and is then set.

FIG. 5(b) shows a known lathe machine tool which comprises a horizontal axis (X axis) along which is disposed a tool 54 and a rotary axis (C axis) on which a workpiece is provided. The X and C axes are axes along which the tool actually moves. These two axes are simultaneously moved, and three axes are controllable by pseudo-creating a Y axis as if performing machining in a Y-axis direction of a machining work orthogonal coordinate system. With this arrangement it is possible to execute complicated machining with a simple construction. There is, however, no means for setting a mechanical error correction quantity for the pseudo Y axis. Hence, a high accuracy encoder 55 is set to the rotary axis, thus measurement-setting the mechanical error at constant angles.

FIG. 3(a) is a block diagram illustrating a conventional control system for effecting a pitch error correction. Referring to FIG. 3(a), the numeral 1 designates a command issued from a numerical control device (hereinafter referred to as a CNC device) to the tool; 2 represents a correction quantity setting means for setting a correction quantity for effecting a pitch error correction with respect to every axis; 4A represents a mechanical axis direction error storage means for storing the correction quantity of each axis set by the correction quantity setting means 2, and 6 represents a command converting means for converting the command 1 to a positional command (a). The positional command (a) is added to the output of the storage means 4A and the added result is output (b) controlling the tool.

FIG. 3(b) is a block diagram depicting a conventional control system for performing a backlash error correction. Referring to FIG. 3(b), the numeral 1 denotes a command issued from the CNC device to the tool; 2 represents a correction quantity setting means for setting the correction quantity for effecting the backlash error correction with respect to every axis; 4A represents a mechanical axis direction mechanical error storage means for storing the correction quantity set in setting means 2; 5 represents a direction reversing means for determining whether or not there is reversal along the mechanical moving axis; and 6 represents a command converting means for converting command 1 into a positional command (a). The stored correction quantity of each axis which is set by the correction quantity setting means 2 is added to each axis command issued to the tool (after the command is converted by converting means 6) and then output (b) to the tool. The mechanical error correction quantity is set with respect to the oblique axis in the same manner as described above in connection with FIG. 3(a) (i.e., the operator performs the conversion).

FIG. 4(a) shows a flowchart for the conventional control process of pitch error correction. Initially, in step 11, it is determined whether or not a command has issued from the CNC device. If it is determined that a command has issued, then it is determined in step 12 whether or not there exists a correction quantity for the axis concerned. If it is determined that the correction quantity is provided, then the correction quantity of each axis is added to the command of each axis (step 18), and the added result becomes an output to the tool. However, if it is determined in step 12 that there is no correction quantity ("N" in step 12), then each axis command is directly output to the tool (step 20).

FIG. 4(b) shows a flowchart for a conventional control process of backlash error correction. In step 11 it is determined whether or not a command has issued from the CNC device. If it is determined that the command has issued, then it is determined in step 12 whether or not there exists a correction quantity for the axis concerned. If it is determined in step 12 that there exists a correction quantity, then it is determined in step 15 whether or not the mechanical moving axis has reversed. During a direction reversion, the correction quantity of each axis is added to the command of each axis, and the added result is output to the tool (step 18). However, if it is determined that there is no correction quantity in step 12, then each axis command is directly output to the tool (step 20). Further, if it is determined in step 15 that there is no direction reversion, then each axis command is directly output to the tool.

The conventional mechanical error corrections (pitch error correction and backlash error correction) are executed in the manner discussed above. Accordingly, the grinding tool (in which the moving axes of the tool are not orthogonal to each other) includes no means for directly measuring the mechanical error of the oblique mechanical axes (e.g., direction Z1 in FIG. 5(a)). Rather, the mechanical error is measured in terms of the orthogonal axes (two or more virtual axes which are orthogonal to each other; e.g., axes Z2–X1 in FIG. 5(a)), and then the mechanical error is converted by the operator into a mechanical error correction quantity in terms of the actual mechanical axes. After this conversion, the mechanical error correction quantity is set. This conversion results in a conversion error. For example, suppose that the mechanical error in the virtual orthogonal coordinate system direction Z2 is 20 $\mu$m in FIG. 5(a), and that the error is converted into a mechanical error on the actual mechanical axis Z (direction Z1). This conversion causes the mechanical error to become 20 $\mu$m $\times \sqrt{2} = 28.284$ $\mu$m ($\theta = 45°$). The converted mechanical error value is then rounded-off resulting in the error value being set at 28 $\mu$m. When reconverting this set error value into a mechanical error in terms of the virtual orthogonal coordinate system direction Z2, it follows that the accuracy degrades to 28 $\mu$m $\div \sqrt{2} = 19.798$ $\mu$m. Accordingly, a problem arises in that the grinding tool will not exhibit good accuracy as a result of the conversion error.

Further, there is no means in the conventional systems for setting the correction quantity of the mechanical error of a pseudo Y axis which, as illustrated in FIG. 5(b), is pseudo-created by the rotary axis C and the rectilinear axis X. Hence, a high-accuracy encoder is set at the center of the rotary axis, and the correction quantity is set by measuring the mechanical error at every constant angle. This leads to a problem in that the correction quantity in the vicinity of the center gets rough. For instance, when a correction pitch is set to 5°, the accuracy in the vicinity of the center is worse than at the end.

Japanese Patent Laid-Open Publication No. 282863/1987 discloses a method of converting a command expressed in terms of the virtual orthogonal coordinate system into a coordinate system in the mechanical axis direction. According to this method, a machining program expressed in terms of the virtual orthogonal coordinate system is first converted into the coordinate system in the mechanical axis direction, and then the command is given. However, this method is not used in determining the mechanical axis error correction.

Further, Japanese Patent Laid-Open Publication No. 21610/1989 discloses a correction method for an oblique-type tool. This method involves the steps of: inputting a tool diameter, decomposing it into components in the mechanical axis direction, adding the components to a moving distance and performing a pulse distribution. Accordingly, this method is not used as a correcting method for effecting the mechanical error correction on the mechanical axis (Z axis).

SUMMARY OF THE INVENTION

It is an object of the present invention to provide a numerical control device which can perform highly accurate machining by overcoming the problem of conversion errors attendant with the conventional systems. This and other objects are obtained by the CNC device of the present invention.

The CNC device according to a first embodiment of the invention comprises an inclination ratio setting means, an orthogonal axis direction mechanical error storage means for storing an error between an actual position and a command position of each mechanical axis, and an error converting means.

The CNC device according to a second embodiment of the invention comprises an angle setting means, an orthogonal axis direction mechanical error storage means, and an error converting means.

The CNC device according to a third embodiment of the invention comprises an inclination ratio setting means, an orthogonal axis direction mechanical error storage means for storing an error during a directional reversal along each mechanical axis, and an error converting means.

The inclination ratio setting means, according to the first embodiment, sets a ratio between the actual mechanical axis coordinate system and the virtually set orthogonal coordinate system. The orthogonal axis direction mechanical error storage means stores a value representing the mechanical error measured between the actual and command positions of the tool when locating the mechanical axis of each mechanical axis coordinate system in a certain position in the virtual orthogonal coordinate direction. The error converting means converts the mechanical error in the virtual orthogonal coordinate direction into a mechanical error in the mechanical axis direction of the actual axis coordinate system.

According to the second embodiment, the angle setting means sets a reference angle when a high-accuracy encoder measures the mechanical error of the rotary axis. According to the third embodiment, the error during the directional reversal along each mechanical axis is stored, and the mechanical error is obtained from this stored error.

BRIEF DESCRIPTION OF THE DRAWINGS

FIG. 1(a) is a block diagram showing a virtual axis mechanical error correction (pitch error correction) control process according to a first embodiment of the invention.

FIG. 2(a) is a flowchart showing the mechanical error correction (pitch error correction) control process of an oblique axis according to the first embodiment of the invention.

FIG. 2(c) is a flowchart showing the mechanical error correction (backlash error correction) control process of the oblique axis according to the third embodiment of the invention.

FIG. 4(a) is a flow chart showing the conventional mechanical error correction (pitch error correction) control process.

FIG. 4(b) is a flowchart showing the conventional mechanical error correction (backlash error correction) control process.

DETAILED DESCRIPTION OF THE PREFERRED EMBODIMENTS

Figure 1B:
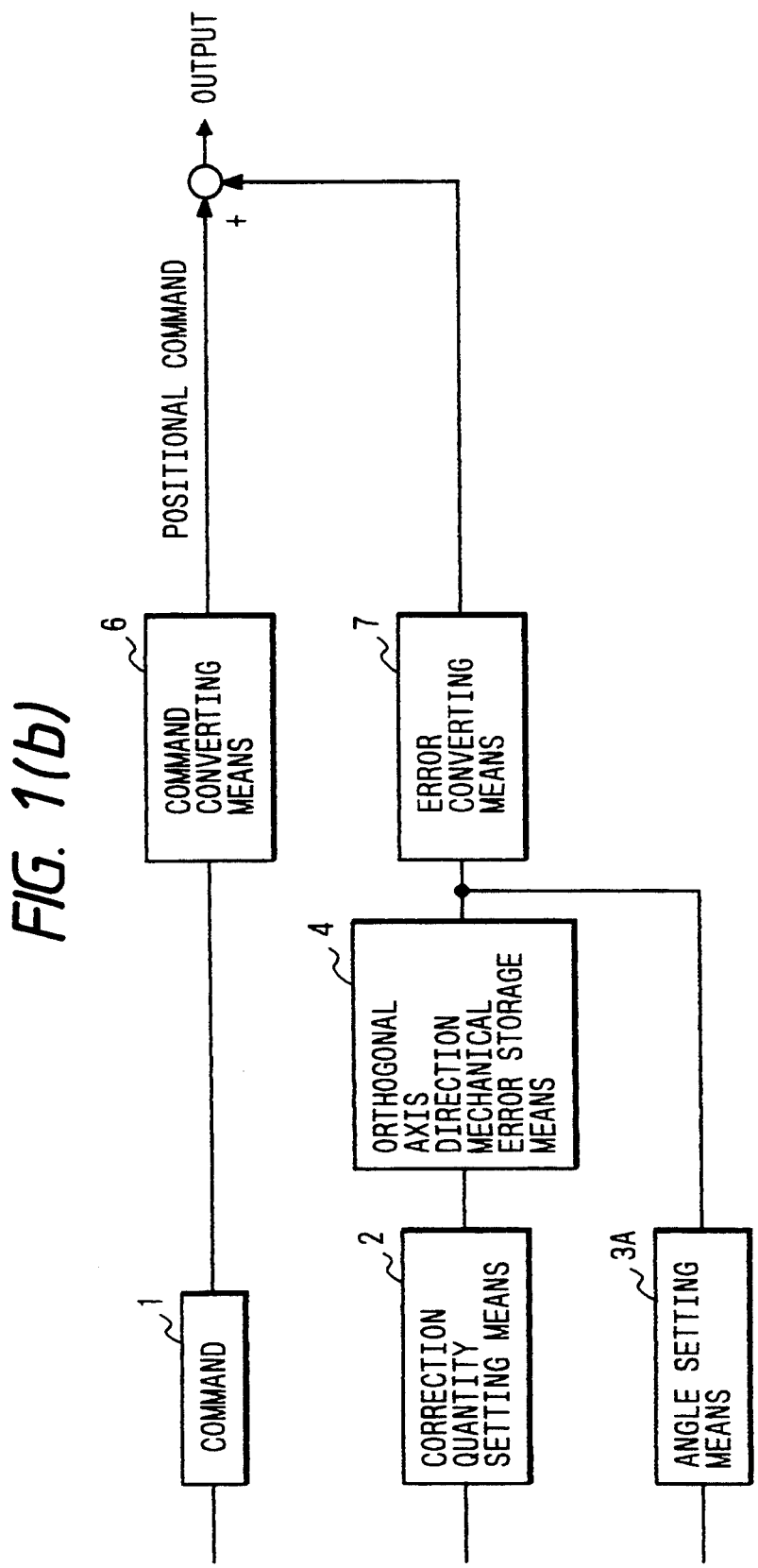
FIG. 1(b) is a block diagram showing the virtual axis mechanical error correction (pitch error correction) control process according to a second embodiment of the invention.

The various embodiments of the invention will hereinafter be described with reference to the drawings.

FIG. 1(a) shows a first embodiment of the invention. Referring to FIG. 1(a), the numeral 1 designates a command issued from a CNC device to control a tool; 2 designates a correction quantity setting means for setting a correction quantity for correcting a mechanical error between an actual position and a command position. The correction quantity is set by the operator in terms of the virtual orthogonal coordinate system so as to obtain the pitch error correction; 3 designates an inclination ratio setting means for setting a ratio between an actual axis coordinate system direction and a virtual orthogonal coordinate system direction (Z1 and Z2, respectively in FIG. 5(a)); 4 designates an orthogonal axis direction mechanical error storage means for storage of a value of the mechanical error set in setting means 2, the stored value being measured in the axial direction of the corresponding virtual orthogonal coordinate system; 6 designates a command converting means for converting the command 1 to a positional command; and 7 designates an error converting means for converting the virtual orthogonal axial direction mechanical error stored in the storage means 4 into a mechanical error in the mechanical axis coordinate system direction in accordance with the inclination ratio set in setting means 3 (a mechanical axis Z (direction Z1) and a mechanical axis X (direction X1) in FIG. 5(a)). The converted mechanical error from error converting means 7 is added to the positional command output by converting means 6, and then output.

Figure 5A:
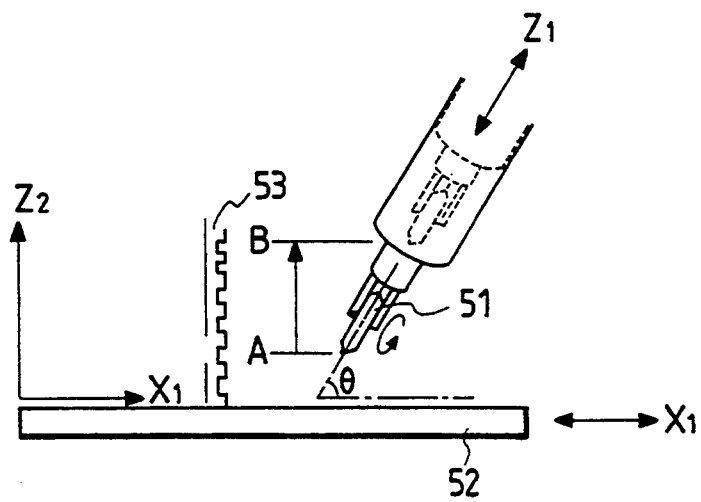
FIG. 5(a) is a diagram for explaining a conventional method of setting the mechanical error correction quantity of an oblique axis.

A specific example will now be provided for the embodiment shown in FIG. 1(a). Referring to FIG. 5(a), if the mechanical axis Z is an axis inclined in the direction Z1 ($\theta = 45°$), an inclination ratio is set at $1:\sqrt{2}$ in the inclination ratio setting means 3. This ratio is set on the assumption that an isosceles right triangle is provided, and represents the ratio between the virtual orthogonal coordinate system direction Z2 and the mechanical axis Z (direction Z1). Assuming that the mechanical error correction quantity measured in the virtual orthogonal coordinate system direction Z2 is 20 $\mu$m, then this quantity (i.e., 20 $\mu$m) is set in the correction quantity setting means 2 and then stored in the orthogonal axis direction mechanical error storage means 4. The stored error value is then converted in the error converting means 7 which has been set with the above-mentioned $1:\sqrt{2}$ ratio by the inclination ratio setting means 3. Accordingly, the error converting means 7 converts the stored orthogonal axis direction error correction quantity (direction Z2) to provide the converted error correction value 20 $\mu m \times \sqrt{2}$ the mechanical axis Z (direction Z1). It should be noted that this converted error value is calculated by the CNC device, rather than by the operator, and is therefore obtained without any digit round-off as in the conventional systems. As a result, highly accurate error correction values are obtained. The converted error value is then added to the converted positional command (output of command converting means 6) to provide a corrected positional command output.

The operation of the embodiment shown in FIG. 1(a) will now be explained in accordance with the flowchart of FIG. 2(a). The flowchart of FIG. 2(a) shows the operational control over the mechanical error correction (pitch error correction) of the inclined axes of the actual mechanical axis coordinate system which are not orthogonal to each other. In step 11, it is first determined whether or not a command (1 in FIG. 1(a)) has issued from the CNC device. If a command has issued, then it is determined in step 12 whether or not there exists a correction quantity (the correction quantity is set in correction quantity setting means 2 by experimentally measuring the mechanical error between the actual mechanical position and the position obtained in response to the command by effecting positioning at a plurality of positions separated by a constant interval, the interval being determined by a parameter). The correction quantities (per interval) are stored in the CNC with respect to the mechanical error between the actual mechanical position and the command position when locating the mechanical axis of the actual coordinate system in a certain position. If a correction quantity has been set, then the inclination ratio is determined in step 14. If the determination of the correction quantity in step 12 is N0 ("N"), i.e., no setting is performed, then a measurement correction quantity is determined (step 13). In step 14 it is determined whether or not a ratio has been set by the inclination ratio setting means 3 between the mechanical axes of the corresponding actual axis coordinate system and the respective axes of the virtually set orthogonal coordinate system. If an inclination ratio is set, then the control process proceeds to step 16. If the inclination ratio is not set, then the correction quantities of the respective axes are added to the commands of the respective axes, and the added result is output to the tool (step 18). In step 16, it is determined whether or not there is a virtual axis (e.g., the virtual orthogonal coordinate system Z2-X1 in FIG. 5(a)). If it is determined in step 16 that there is a virtual axis, then the mechanical error correction in accordance with the set inclination ratio is determined in step 17. For example, if the mechanical error correction quantity measured in the virtual orthogonal coordinate system direction Z2 when shifting the mechanical axis Z (direction Z1) from position A to position B is set to 20 $\mu$m in FIG. 5(a) and the inclination ratio (i.e., the ratio in the virtual orthogonal coordinate system direction Z2 with respect to the mechanical axis Z (direction Z1)) is set to $1:\sqrt{2}$ on an assumption that the isosceles right triangle is provided when $\theta = 45°$ in FIG. 5(a), then the mechanical error of the mechanical axis Z (direction Z1) is equal to 20 μm (virtual axis direction mechanical error) x$\sqrt{2}$ (inclination ratio between virtual orthogonal coordinate system direction Z2 and actual mechanical axis Z (direction Z1)). The positional command is added to the thus converted mechanical axis Z (direction Z1) mechanical error, and the added result is output to the tool (step 19).

If it is determined in step 16 that there is no virtual axis, then the respective axis commands are added to the correction quantities of the individual axes, and the added values are output to the tool (step 18). If it is determined in step 12 that there is no correction quantity, then it is determined in step 13 whether or not there exists a mechanical error correction quantity (mechanical error correction quantity in the virtual orthogonal coordinate system direction Z2 when moving the mechanical axis Z from position A to position B in the direction Z1 in FIG. 5(a)) which is measured in the axial direction of the virtual orthogonal coordinate system. If it is determined in step 13 that a measurement correction quantity exists, then the virtual axis is determined (step 16). If it is determined in step 13 that there is no measurement correction quantity, then the commands of the respective axes are outputted directly to the tool (step 20).

A second embodiment of the invention will now be described with reference to FIG. 1(b). Referring to FIG. 1(b), the numeral 1 represents a command issued from the CNC device for controlling the tool; 2 represents a correction quantity setting means for setting correction quantities measured at every constant angle when the operator places a high-accuracy encoder at the center of the rotary axis in order to control the mechanical error correction (pitch error correction); 3A represents an angle setting means for setting an angle ($\theta$ in FIG. 5(b)) for measuring the mechanical error between the actual mechanical position and the command position when effecting positioning at every constant angle; 4 represents an orthogonal axis direction μ mechanical error storage means for storing the mechanical error correction quantity; 6 represents a command converting means for converting the command 1 to a positional command; and 7 represents an error converting means for converting the orthogonal axis direction mechanical error stored in the storage means 4 into a mechanical error in the virtual orthogonal coordinate system direction. The output of the error converting means 7 is added to the converted positional command (output of the command converting means 6) and then the added result is output to control the tool.

Figure 5B:
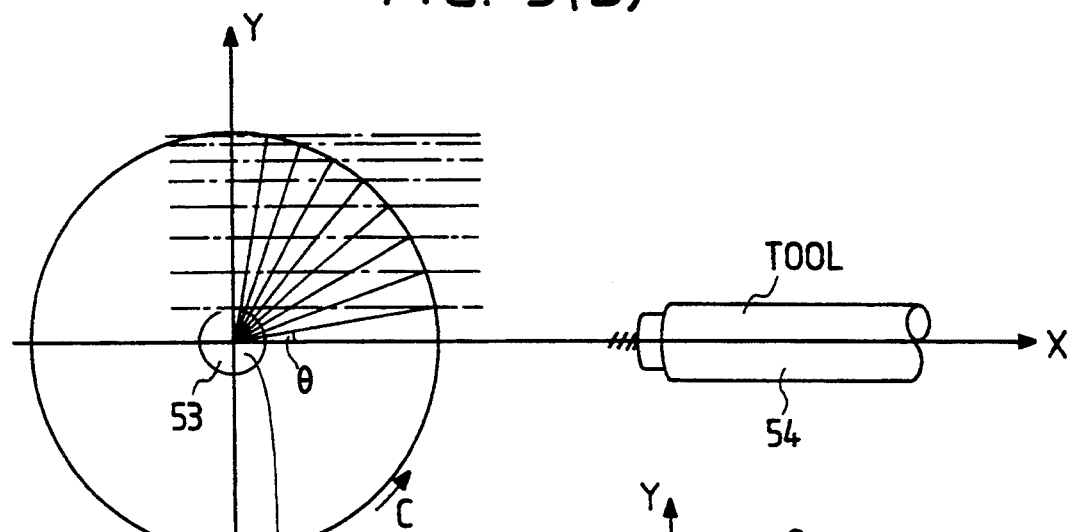
FIGS. 5(b) and 5(c) are diagrams for explaining a conventional method of setting the mechanical error correction quantity of a pseudo Y axis.
Figure 5C:
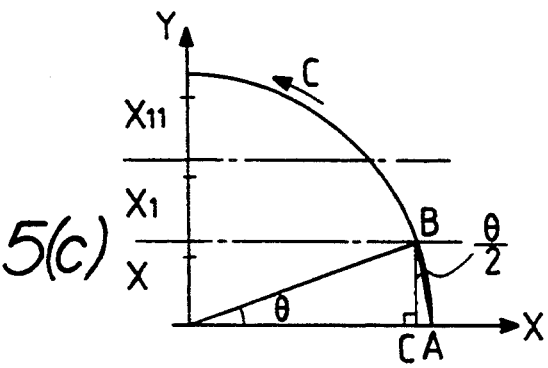

A specific example of the second embodiment will now be provided. Referring to FIGS. 5(b) and 5(c), in the case of a pseudo axis Y for pseudo-creating a Y-directional motion by the rotary axis C and the rectilinear axis X, the interval in the Y-axis direction, which in the conventional systems has been gradually narrowed in a direction towards the outside of the rotary axis, is according to this embodiment made constant by setting the angle $\theta$ constant in the angle setting means 3A. Suppose, for example, that the angle set by the angle setting means 3A is, for instance, 10°, then there is measured a mechanical error correction quantity when effecting positioning A–B at every pseudo Y axis component B–C constant interval. The measured A–B mechanical error correction quantity is converted into a pseudo Y-axis direction mechanical error correction quantity. For this purpose, A–B is set as a straight line, and A–B–C is conceived as a triangle. Based on this assumption, the following relation is established: pseudo Y axis direction mechanical error correction quantity=A–B mechanical error correction quantity cos ($\theta/2$)=A–B mechanical error correction quantity cos (10/2). This calculation 2 is performed by the CNC device and is therefore obtained without any digit round-off, thereby providing a highly accurate calculation.

Figure 2B:
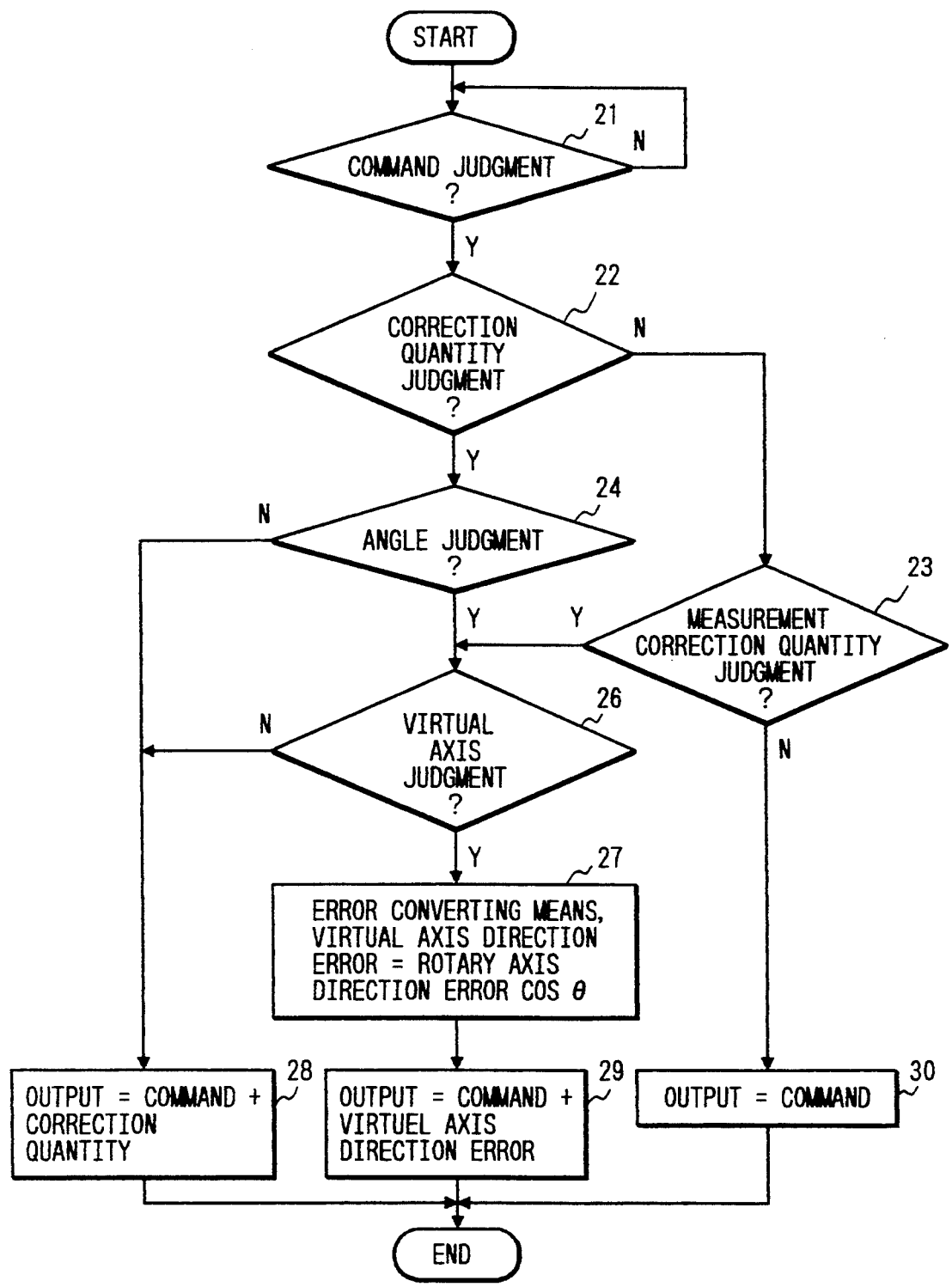
FIG. 2(b) is a flowchart showing the mechanical error correction (backlash error correction) control process of an oblique Y axis according to the second embodiment of the invention.
Figure 3A:
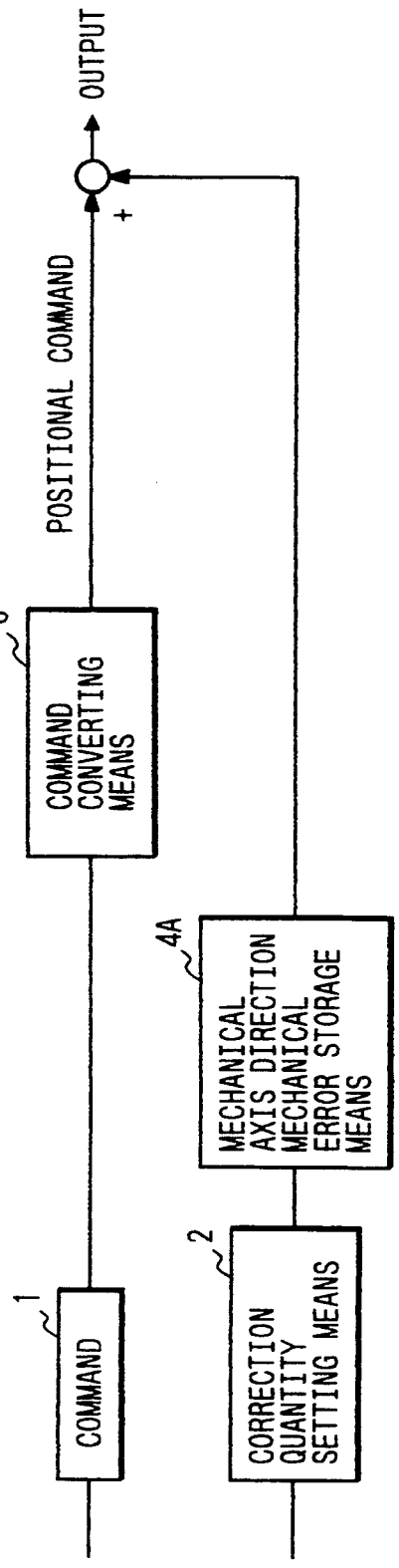
FIG. 3(a) is a block diagram showing a conventional mechanical error correction (pitch error correction) control process.
Figure 3B:
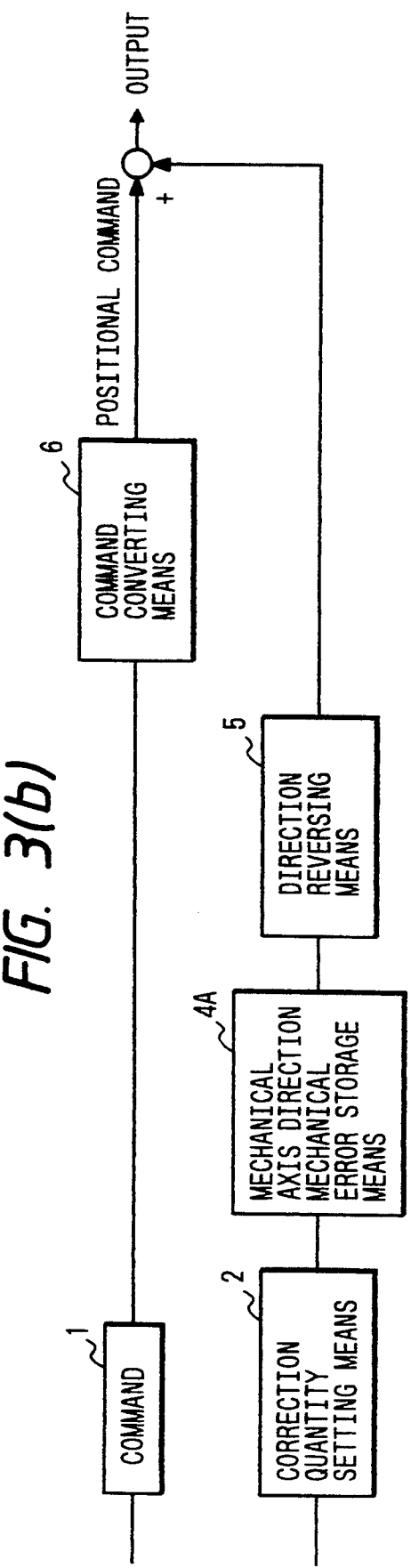
FIG. 3(b) is a block diagram showing a conventional mechanical error correction (backlash error correction) control process.

Next, the operation of the second embodiment will be explained in connection with FIG. 2(b). FIG. 2(b) is a flowchart showing the control over the mechanical error correction (pitch error correction) of the virtual axes (two or more virtual axes orthogonal to each other). It is first determined in step 21 whether or not a command has issued from the CNC device, If a command has issued, then it is determined in step 22 whether or not there exists a correction quantity. The correction quantity is set by measuring the mechanical error between the actual mechanical position and the command position by positioning the rotary axis (at a plurality of positions separated by a constant angle (the angle being determined by a parameter), and then the correction quantities are stored. If the correction quantity is set, then the angle set by the angle setting means 3A is determined (step 24). If in step 22 it is determined that the correction quantity is 0 ("N" in step 22), then it is assumed that no setting has been carried out, and the measurement correction quantity is determined (step 23). On the other hand, if it is determined in step 24 that a mechanical error measurement central angle $\theta$ of the rotary axis has been set, then the virtual axis is determined (step 26). If it is determined in step 24 that a central angle has not been set, then the correction quantities of the respective axes are added to the commands of the individual axes, and the added result becomes the output to the tool (step 28). In step 26 it is determined whether or not there is a virtual axis (pseudo axis Y for pseudo-creating a motion on the axis Y using the rotary axis C and the rectilinear axis X in FIG. 5(b)). If in step 26 it is determined that there is defined a virtual axis, then the error between the actual position and the command position when locating each mechanical axis in a certain position is converted into a mechanical error correction quantity in the mechanical axis direction in accordance with the angle ($\theta$ in FIG. 5(b)) (pseudo Y axis direction mechanical error=mechanical error correction quantity cos ($\theta/2$) at every constant angle of the rotary axis) (step 27). The converted mechanical error correction quantity in the mechanical axis direction is added to the command, and the added result is output to the tool (step 29). If it is determined in step 26 that a virtual axis has not been defined, then the correction quantities of the respective axes are added to the individual axis commands, and the added result is output to the tool (step 28). If in step 22 it is determined that no correction quantity has been set, then the control process proceeds to step 23 where it is determined whether or not there exists a mechanical error correction quantity measured at every constant angle of the rotary axis. If it is determined that the measurement correction quantity is provided, then the control process proceeds to step 26. On the other hand, if it is determined in step 23 that no measurement correction quantity is provided, then the commands of the respective axes are directly output to the tool (step 30).

Figure 1C:
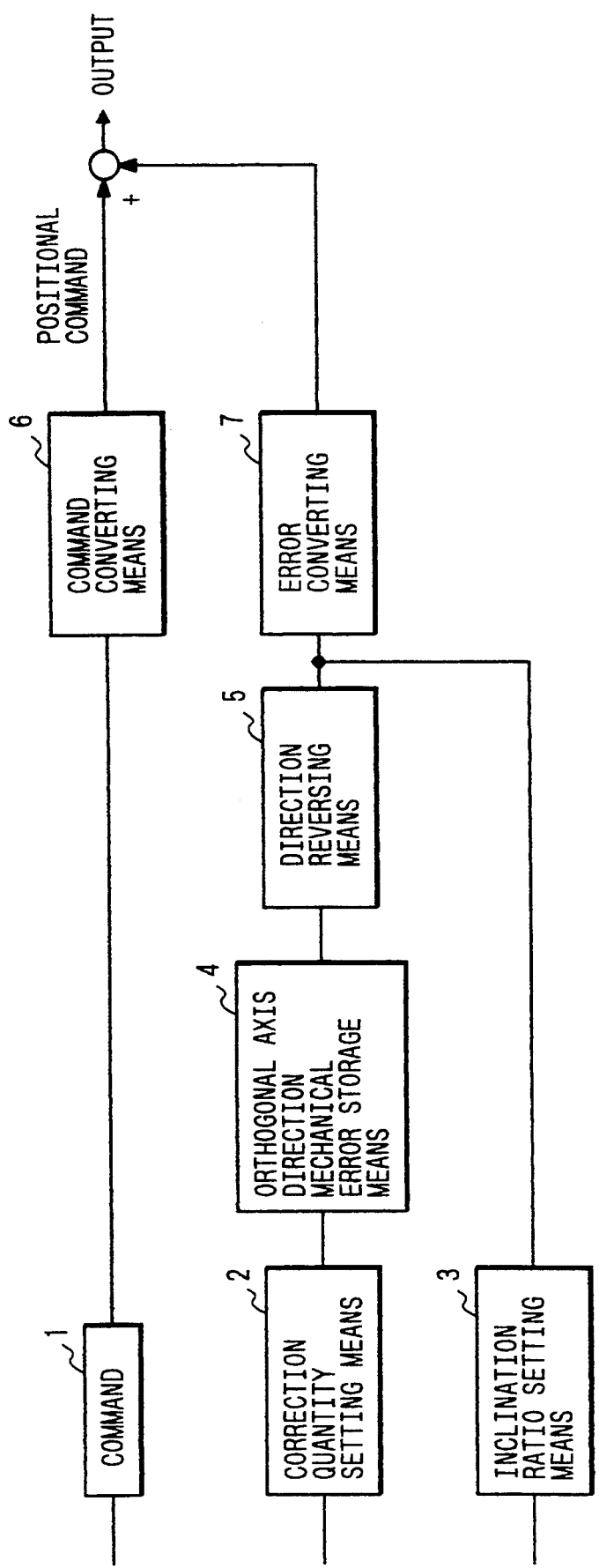
FIG. 1(c) is a block diagram showing a virtual axis mechanical error correction (backlash error correction) control process according to a third embodiment of the invention.

The third embodiment of the invention will now be described with reference to FIG. 1(c). Referring to FIG. 1(c), the numeral 1 denotes a command issued from the CNC device for controlling the tool; 2 represents a correction quantity setting means for setting a correction quantity for correcting a mechanical error of a mechanical position when the operator moves the mechanical axis of the actual axis coordinate system by a constant quantity from a (+) direction to a (−) direction in order to control a mechanical error correction (backlash error correction); 3 represents an inclination ratio setting means for setting a ratio between the actual axis coordinate system direction Z1 and the virtual orthogonal coordinate system Z2 as shown in FIG. 5(a); 4 represents an orthogonal axis direction mechanical error storage means for storing the set correction quantity; 5 represents a direction reversing means for determining whether or not a moving mechanical axis has reversed in terms of direction; 6 represents a command converting means for converting the command 1 to a positional command; and 7 represents an error converting means for converting the orthogonal axis direction mechanical error stored in the storage means 4 into a mechanical error in the mechanical axis direction in accordance with the set inclination ratio, and in accordance with whether a direction reversal has occurred.

A specific example of the third embodiment shown in FIG. 1(c) will now be given. Referring to FIG. 5(a), when the mechanical axis Z (Z1 direction) is an inclined axis (e.g., $\theta = 45°$) with respect to the orthogonal coordinate system, the corresponding inclination ratio $1:\sqrt{2}$ is set by the inclination ratio setting means 3 on the assumption that an isosceles right triangle is provided as discussed above in connection with FIG. 5(b). Further, suppose that the mechanical error correction quantity during the direction reversion (i.e., when the tool moves from position A to position B and then in a reverse direction back to position A in FIG. 5(a)) which is measured in the axial direction Z2 of the virtual orthogonal coordinate system direction is 20 μm. If this quantity is converted along the mechanical axis Z (direction Z1), then the mechanical error correction quantity of the mechanical axis Z (direction Z1) is given by $20 \mu m \times \sqrt{2}$. This calculation is performed by the CNC device and therefore is obtained without any digit round-off, thereby providing a highly accurate calculation.

Next, the operation of the third embodiment will be described in connection with FIG. 2(c). FIG. 2(c) is a flowchart showing the control over the mechanical error correction (backlash error correction) of the inclined axes of the mechanical or actual axis coordinate system which are not orthogonal to each other. In step 31, it is first determined whether or not a command has issued from the CNC device. If a command has issued, then the mechanical axis of the actual axis coordinate system is shifted in the (+) direction (e.g., from position A to position B in FIG. 5(a)). It is then determined in step 32 whether or not there exists a mechanical error correction quantity during direction reversion when moved in the (−) direction (e.g., from position B back to position A in FIG. 5(a)). If in step 32 the correction quantity is set, then an inclination ratio is determined in step 34. If in step 32 there is no correction quantity then it is assumed that no correction quantity has been set, and the control process proceeds to step 33 to determine if there is any measured correction quantity. In step 34, it is determined whether or not the ratio of the mechanical axes of the actual axis coordinate system relative to the respective axes of the pseudo-set orthogonal coordinate system (pseudo orthogonal coordinate system Z2-X1 in FIG. 5(a)) has been set. If the inclination ratio is set in step 34, then it is determined in step 35 whether or not the direction of the moving mechanical axis has performed a directional reversion. If a reversal has been performed, then a virtual axis determination is executed in step 36. On the other hand, if it is determined in step 35 that no command reversion has been performed, then the commands of the respective axes are directly provided as outputs to the tool (step 40). Further, if in step 33 it is determined that there is no measured correction quantity, then the control process proceeds directly to step 40. If in step 36 it is determined that a virtual axis is set, then the control process proceeds to step 37 to determine the mechanical error correction quantity for the directional reversion. For example, if the mechanical error correction quantity during the directional reversion is measured at 20 μm in terms of the virtual orthogonal coordinate system direction Z2 when positioning the mechanical axis Z (direction Z1) from position A to position B and then in a reverse direction from position B to position A as shown in FIG. 5(a), then this error correction quantity is converted into a mechanical error of the mechanical axis Z (direction Z1). Specifically, this conversion is performed by multiplying the correction quantity 20 μm (in terms of the virtual orthogonal coordinate system) by $\sqrt{2}$ (the set inclination ratio). That is, the mechanical error of the mechanical axis Z (direction Z1) is equal to $20 \mu m \times \sqrt{2}$. The control process then proceeds to step 39 where the calculated mechanical error and the command are added, with the added result being output to the tool. Further, if in step 36 it is determined that there is no virtual axis, then the commands of the respective axes are added to the correction quantities of the individual axes, and the added result is output to the tool (step 38).

As discussed above, according to the present invention, the set correction quantity measured in terms of the virtual orthogonal coordinate system is converted by the CNC device into a correction quantity in terms of the actual mechanical coordinate system. Since this conversion is performed by the CNC device rather than by the operator as is done in the conventional systems, there is almost no conversion error during the converting operation. As a result, highly accurate machining can be obtained.

What is claimed is:

1. In a numerical control device for driving elements respectively along at least two mechanical axes which are not orthogonal to each other, the improvement characterized by comprising:

an inclination ratio setting means for setting an inclination ratio based on an angle of a corresponding mechanical axis with respect to each axis of a pseudo-set orthogonal coordinate system;

an orthogonal axis direction mechanical error storage means for storing error values representing an error measured between an actual position of a device and a desired command position when locating each device along a respective one of said mechanical axes with respect to said orthogonal coordinate system; and an error converting means for converting each of said error values into a mechanical error in the direction of a respective one of said mechanical axes.

2. In a numerical control device for driving elements respectively along or about at least two mechanical axes which include a rotary axis and a rectilinear axis, the improvement characterized by comprising:

an angle setting means for setting inclinations of rotary axis tangent directional vectors and a corresponding rectilinear mechanical axis from each axis of a pseudo-set orthogonal coordinate system;

an orthogonal axis direction mechanical error storage means for storing error values representing an error measured between an actual position of a device and a desired command position when locating each device along or about a respective one of said mechanical axes with respect to said corresponding virtual orthogonal coordinate system; and an error converting means for converting each of said error values into a mechanical error in the direction of a respective one of said mechanical axes.

3. In a numerical control device for driving devices respectively along at least two mechanical axes which are not orthogonal to each other, the improvement characterized by comprising:

an inclination ratio setting means for setting an inclination ratio based on an angle of a corresponding mechanical axis with respect to each axis of a pseudo-set orthogonal coordinate system;

an orthogonal axis direction mechanical error storage means for storing error values representing an error measured during a directional reversion of each device along a respective one of said mechanical axes with respect to said corresponding orthogonal coordinate system; and an error converting means for converting said error values into a mechanical error in the mechanical direction of a respective one of said axes.

4. A numerical control device for driving devices respectively along or about at least two mechanical axes which are not orthogonal to each other, comprising:

an inclination ratio setting means for setting an inclination ratio based on an angle between each of the mechanical axes and a corresponding axis, of a pseudo-set orthogonal coordinate system;

a correction quantity setting means for setting a correction quantity representing a positional error which occurs during movement of the devices along the at least two mechanical axes, said correction quantity being expressed with respect to the pseudo-set orthogonal coordinate system; and error converting means for converting, in accordance with the inclination ratio, the correction quantity to a converted correction quantity which represents the positional error along the at least two mechanical axes.

5. The numerical control device defined in claim 4, further comprising a command converting means for converting a command for driving the mechanical axes into a positional command.

6. The numerical control device as defined in claim 5, further comprising adding means for adding the converted correction quantity to the positional command.

7. The numerical control device as defined in claim 4, further comprising storage means for storing the set correction quantity.

8. A numerical control device for driving devices along or about at least two mechanical axes, the at least two mechanical axes including a rotary axis and a rectilinear axis, the numerical control device comprising:

a setting means for setting information representing a relationship between the at least two mechanical axes and a pseudo-set orthogonal coordinate system;

correction quantity setting means for setting a correction quantity representing a positional error which occurs during movement of the devices along or about the mechanical axes, said correction quantity being expressed in terms of the pseudo-set orthogonal coordinate system;

error converting means for converting, in accordance with the set information, the set correction quantity into a converted correction quantity which represents the positional error with respect to the at least two mechanical axes.

9. The numerical control device as defined in claim 8, wherein said pseudo-set orthogonal coordinate system includes an axis which is orthogonal to the rectilinear mechanical axis.

10. The numerical control device as defined in claim 8, wherein said correction quantity is expressed with respect to said axis of the pseudo-set orthogonal coordinate system which is orthogonal to the rectilinear mechanical axis.

11. The numerical control device as defined in claim 8, further comprising command converting means for converting a command for driving the devices along the mechanical axes to a positional command, and adding means for adding the converted correction quantity to the positional command.

12. A numerical control device for driving devices along at least two mechanical axes which are not orthogonal to each other, comprising:

inclination ratio setting means for setting an inclination ratio based on an angle between each of the mechanical axes and a corresponding axis of a pseudo-set orthogonal coordinate system;

means for storing positional error values which occur during movement in a reverse direction along each mechanical axis, said stored positional error being expressed with respect to the pseudo-set orthogonal coordinate system; and error converting means for converting the positional error into a converted positional error which represents the positional error with respect to the at least two mechanical axes.

13. The numerical control device as defined in claim 12, further comprising means for converting a command for driving the devices along the mechanical axes to a positional command, and adding means for adding the converted positional error to the positional command.

* * * * *